Figures 1, 2:
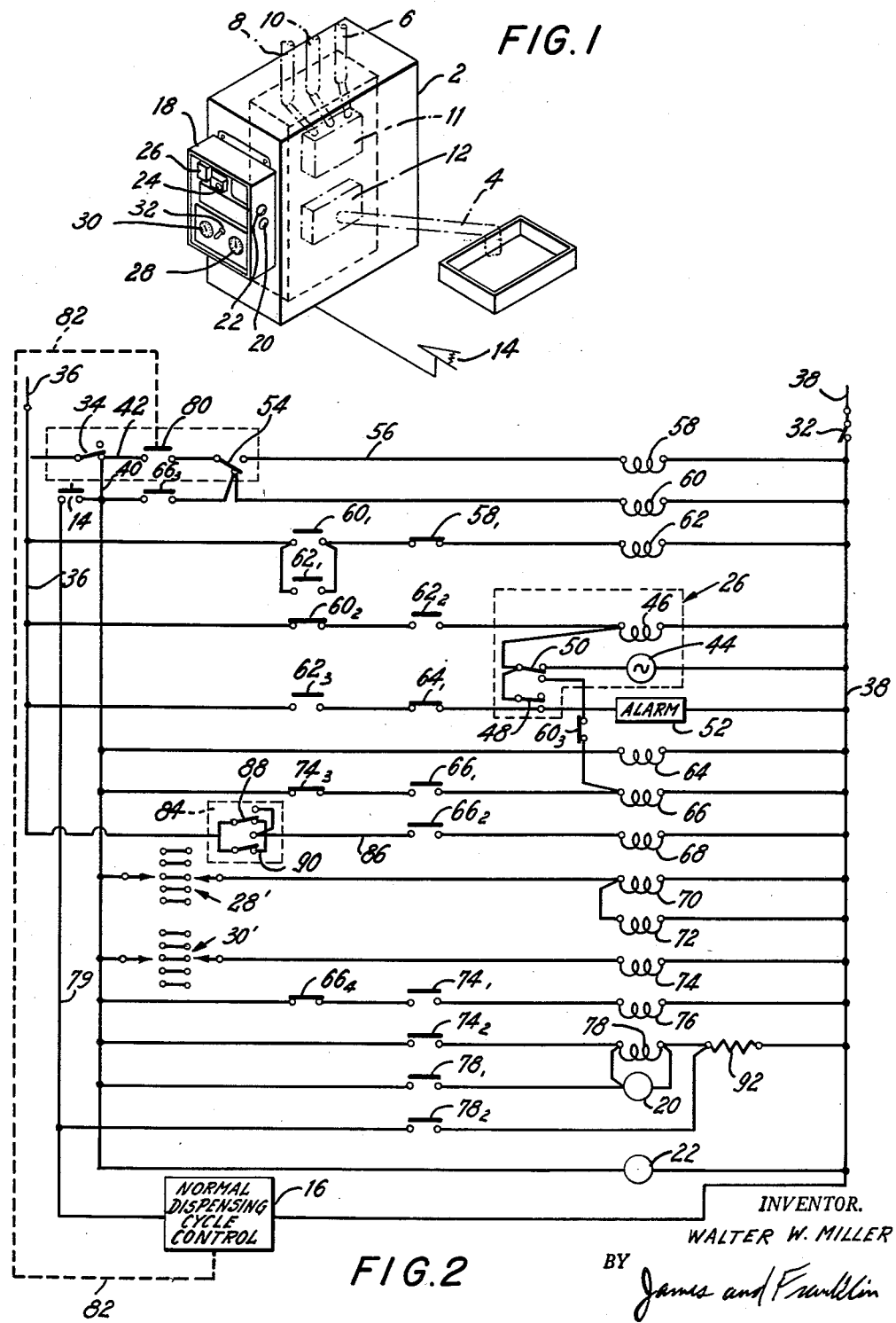

Nov. 12, 1963    W. W. MILLER    3,110,418
AUTOMATIC CONTROLS FOR DISPENSING MACHINE
Filed Jan. 5, 1961

INVENTOR.
WALTER W. MILLER
BY James and Franklin
ATTORNEYS

United States Patent Office 3,110,418
Patented Nov. 12, 1963

3,110,418
AUTOMATIC CONTROLS FOR DISPENSING MACHINE
Walter W. Miller, Abington Township, Montgomery County, Pa., assignor to Novo Industrial Corporation, New York, N.Y., a corporation of New York
Filed Jan. 5, 1961, Ser. No. 80,903
10 Claims. (Cl. 222—25)

The present invention relates to an automatic system for controlling the operation of a dispensing machine, and particularly a machine adapted to dispense substances or mixtures of substances which can be permitted to stand only for limited periods of time.

There are many types of materials and mixtures which must be dispensed within a predetermined period of time after they have been prepared for dispensing. Typical of such substances are mixtures of various resins and hardeners which, when once mixed, will set to a hard and tough condition after the passage of a relatively short period of time, which may be measured in minutes. The permissible length of time between mixing and dispensing is commonly termed the "pot life" of the mixture. It will be understood that that term is here used generically to indicate any permissible period of time between preparation and dispensing of any material or mixture.

In Schneider Patent 2,788,953 of April 16, 1957 entitled "Automatic Proportional Metering, Mixing and Dispensing System" there is disclosed a system for mixing resin and hardener in predetermined proportions and for dispensing that mixture. That patent also discloses timed controls for emergency dispensing by automatically causing the system to dispense a predetermined amount of mixed material if, during a given period of time, a predetermined amount of that mixture has not been dispensed under normal conditions. The present invention may be considered as in some respects an improvement over the automatic emergency control system disclosed in the aforementioned patent, and in other respects as a different approach to the attainment of the same end.

The automatic emergency control system disclosed in the aforementioned Schneider patent, while entirely effectual for its designed purposes, has nevertheless evidenced certain disadvantages and a certain lack of flexibility in operation and adaptation to differing production requirements which it is the prime object of the present invention to overcome.

Automatic emergency dispensing from the mixer if sufficient mixed material is not withdrawn therefrom within a given period of time is essential in order to prevent the mixed material from exceeding its pot life and setting in the mixer, thereby requiring disassembly and cleaning of the mixer, an operation which is very difficult and time consuming. Nevertheless automatic emergency dispensing is to be avoided if possible, because it involves a wastage of material and often involves soiling of the work area, as when a receptacle is not in place to receive the automatically dispensed material or when that receptacle is filled to overflowing. As a practical matter, when these dispensing machines are used in a production line the actuation of the automatic emergency dispensing system often comes about through lack of attention on the part of the personnel in charge. Accordingly, the present system provides an alarm, preferably of the audible type, which is actuated a short time in advance of the start of the automatic dispensing cycle, thereby to apprise the operator that automatic emergency dispensing is imminent and giving him an opportunity to use the machine for productive dispensing or to make sure that an appropriate receptacle is provided to receive the material which is automatically dispensed.

Along the same lines, when an operator is in charge of a number of dispensing machines, or when his attention must be divided between the operation of a given dispensing machine and other functions, it is desirable that the operator be apprised of the fact that automatic dispensing has taken place at a given machine, in order that he might take steps to ensure either that that machine is thereafter used productively or, if that is not desired, that it be purged of the time-sensitive material and placed in stand-by condition until such time as its normal dispensing operations should be resumed. Accordingly the system of the present invention provides an indicator, preferably of the visible type, which will become actuated whenever automatic dispensing has taken place and which will remain actuated until the operator's attention has been brought thereto. As here specifically disclosed this indicator remains actuated until such time as the operator has taken over control of the machine and has caused it to go through either a normal dispensing cycle or a complete purging cycle. Thus no special action on the part of the operator, other than that normally associated with his manual control of the dispensing or purging function of the machine, is required in order to de-actuate the indicator.

When dispensing machines of this type are to be rendered inactive for any period of time in excess of the pot life of the material with which they are to dispense, it is necessary that the time-sensitive material be purged from the machine. To this end the machine is provided with a supply of purging fluid which is caused to pass through those parts of the machine normally containing the time-sensitive material. On occasion an operator will turn off the machine without purging the time-sensitive material therefrom. When he turns off the machine, as by removing electrical power from the dispensing elements thereof, he will by the same token render the automatic emergency dispensing system inactive, and hence the time-sensitive material in the machine will set and harden, or otherwise spoil. In accordance with the present invention the control system is so designed that if the machine is turned off before it has been purged an alarm will be actuated to remind the operator that he has forgotten to perform an essential operation.

Many dispensing machines, of which the specific machine disclosed in the aforementioned Schneider patent is an example, dispense materials in units of predetermined amounts by weight or by volume. The amount of time involved in the dispensing of each of these units will vary not only with the size of the units, which may well be variable insofar as a given machine is concerned, but also with the viscosity of the materials being dispensed. Even when the same materials are employed these viscosities may vary in accordance with the temperature of the materials. Accordingly, if a given machine is to be accurately adaptable to many different applications, control of the amount of material automatically dispensed is preferably made without direct reference to the time involved in automatic dispensing. A convenient way to measure the amount of material actually dispensed is to count the number of units of material which are dispensed, and the system of the present invention is based upon that principle.

In addition, entirely different criteria may control the amount of material to be dispensed under normal production line conditions and the amount of material to be automatically dispensed in an emergency situation in order to prevent the material within the machine from exceeding its pot life. Thus the amount of material to be dispensed in a cycle of normal dispensing may be determined by the size of the molds into which that material is to be fed and the number of such molds which are to be available at a given time. The amount of material to be automatically dispensed in order to renew the pot life of the material in the machine may be determined by the size of the mixer chamber in that machine. Accordingly, in the system of the present invention the amount of material to be automatically dispensed is controlled entirely independently of the normal dispensing cycle.

To the accomplishment of the above, and to such other objects as may hereinafter appear, the present invention relates to an automatic control system for a dispensing machine, as defined in the appended claims, and as described in this specification, taken together with the accompanying drawings, in which:

FIG. 1 is a schematic representation of a dispensing machine which incorporates the control system of the present invention; and FIG. 2 is a circuit diagram of that control system.

The dispensing machine is here schematically disclosed as comprising a housing 2 from which a dispensing nozzle 4 extends and to which supply lines 6, 8 and 10 are provided, the supply lines 6 and 8 being adapted to convey the active materials which are to be mixed and dispensed (e.g. resin and hardener) while the supply line 10 carries a suitable solvent for the resin and hardener which is used for purging or cleaning the machine. The supply lines 6, 8 and 10 extend to a controllable selecting means 11 which, insofar as the present invention is concerned, may be set in any appropriate manner to connect a mixing chamber 12 either with the supply lines 6 and 8 or with the supply line 10, depending upon whether material dispensing or purging is desired. The mixing chamber 12 communicates with the dispensing nozzle 4. A foot switch 14 or other manual control is connected to the machine for initiating a normal dispensing cycle by means of control means 16 (see FIG. 2) the particular nature of which forms no part of the present invention. A housing 18 shown attached to the housing 2 contains the elements of the control system of the present invention. A pair of pilot lights 20 and 22 of different colors are visible from the exterior of the cabinet, and within the cabinet is an adjustable time setting knob 24 for the timer 26, a pair of selector switches 28 and 30 for setting a pair of stepped counters 28' and 30' respectively (see FIG. 2) to count the number of units of material which are to be dispensed upon emergency dispensing, and a toggle switch 32.

Turning now to FIG. 2, which is a circuit diagram showing those portions of the control system directly pertinent to the instant invention, a pair of electrical supply lines 36 and 38 are shown, across which any suitable external source of power, such as the usual 115-volt A.C., may be connected. The toggle switch 32 is connected in the line 38. It is closed whenever the control system of the present invention is to be used. The switch 34 is connected between supply line 36 and lines 40 and 42, and it too is adapted to be closed whenever the control system is to be rendered operative. Instead of being a separate switch, as here specifically disclosed, it may be a part of a switch performing other functions, such as control of the application of power to the dispensing machine proper. Power is applied to the dispensing machine when switch 34 is in its closed position.

The timer 26 comprises a motor 44, and a clutch which is engaged when clutch winding 46 is energized, the motor 44 driving timing mechanism through the clutch, the timing mechanism moving switches 48 and 50 from their illustrated position to their other position when the timer has measured predetermined timed intervals. The time intervals for the moving of switch 48 from its normal illustrated position to its other position may be adjusted by setting of the knob 24, corresponding to the pot life of the material being dispensed. The switch 50 is moved from its normal position to its other position a predetermined period of time (e.g., seven seconds) after the switch 48 is actuated. Whenever the clutch winding 46 is de-energized the motor will be disengaged from the timing mechanism and the timer will reset.

The alarm 52 may take any desired form. It is preferably audible in order that it may call attention to itself without fail.

Switch 54 is operatively connected to the selecting means 11 so as to control whether the mixer 12 is to be supplied with resin and hardener through the supply lines 6 and 8 or with purging fluid through the supply line 10. When the switch 54 is in the position illustrated the mixer 12 will be supplied with resin and hardener. When it is in its other position, in engagement with line 56, the machine will be supplied with purging fluid.

A plurality of relays are provided, the actuating coils therefor being designated 58, 60, 62, 64, 66, 68, 70, 72, 74, 76 and 78 respectively. These relay windings control relay contacts. Thus relay winding 58 controls contact $58_1$, relay winding 60 controls contacts $60_1$ and $60_2$, and so on, the relay contacts being designated by reference numerals corresponding to the relay windings which control them and differentiated one from the other by means of numbered subscripts. FIG. 2 shows the relay contacts in the position which they assume when their respective relay windings are de-energized.

The foot switch 14 is connected by line 79 to the normal dispensing cycle control means 16, that control means 16 being effective, in known manner, when the electrical circuit thereto is completed, to initiate the normal dispensing action of the machine and to continue that action for a predetermined period of time or until a predetermined amount of material has been dispensed. The normal dispensing cycle control means 16 is operatively connected to the switch 80 located between the switches 34 and 54, the operative connection being indicated by the broken line 82. The switch 80 is normally open, but is closed during the entire time that normal dispensing under the control of normal dispensing cycle control means 16 continues.

The box 84 schematically shown in FIG. 2 represents means for providing electrical impulses to the line 86 to which it is connected whenever the dispensing machine has dispensed a unit of material of predetermined amount. These impulses may be supplied in various ways, depending upon the particular dispensing machine involved. When a dispensing machine of the type shown in Schneider Patent 2,788,953 is employed, which machine is provided with individual metering pumps for the resin and hardener respectively, those pumps being provided with limit switches preventing the recycling of either pump until the other pump has completed its cycle, those limit switches may themselves be employed to provide the energy pulses, the limit switches for the resin and hardener pumps at the end of their delivery strokes being here used and designated 88 and 90 respectively.

The operation of the system of the present invention is as follows: Closure of switch 34 readies the machine for dispensing. Sequentially, closure of switch 32 readies the control system for functioning and pilot light 22 becomes illuminated to so indicate. Switch 54 will be in the position shown for normal dispensing, being moved to its other position only when solvent purge is to take place. Relay winding 64 will be energized, opening contacts $64_1$.

When the foot switch 14 is closed to initiate a cycle of normal dispensing, the normal dispensing cycle control means will be energized, normal dispensing will commence, and switch 80 will close and will remain closed for as long as normal dispensing takes place. With switch 80 closed relay winding 60 is energized, closing contacts $60_1$ and opening contacts $60_2$. The closure of contacts $60_1$ energizes relay winding 62, which closes relay contacts $62_1$, $62_2$, and $62_3$. The closure of contacts $62_1$ creates a holding circuit for relay winding 62. The closure of contacts $62_2$ and $62_3$ is ineffectual at this point because contacts $60_2$ and $64_1$ are open.

This situation continues until normal dispensing has terminated as determined by the normal dispensing cycle control 16. Switch 80 will then open and relay winding 60 will be de-energized. Contacts 60₁ will open, but this will have no effect on winding 62 because contacts 62₁ are closed. Contacts 60₂ will close, thus completing a circuit through the timer clutch winding 46 and through the switch 50 to the timer motor 44. The timer 26 will commence to time.

If during the time that the timer is timing the foot switch 14 should again be depressed the switch 80 will close, relay winding 60 will again be energized, contacts 60₂ will open, and both the timer motor 44 and the timer clutch winding 46 will be de-energized, the timer then resetting so as to be ready to time when again called upon.

If a predetermined period of time, as determined by the setting of the knob 24, elapses, during which time the foot switch 14 is not closed, the switch 48 will be shifted by the timer, thus closing a circuit through the alarm 52 (that alarm has not previously been actuated because contacts 64₁ are open). The alarm 52 will sound, thus calling the attention of the operator to the fact that an emergency automatic purge cycle will shortly commence and giving him time to initiate a normal dispensing cycle by closing the foot switch 14 or to take such other steps as may be proper.

A predetermined period of time (e.g., seven seconds) after switch 48 shifts, the timer 26 (if not interrupted by closing of the foot switch 14 or otherwise) will shift switch 50, thus completing a circuit through contacts 60₃ to relay winding 66. Energization of that winding 66 causes contacts 66₁, 66₂ and 66₃ to close and causes contacts 66₄ to open. Contacts 66₁ close a holding circuit for winding 66. The closure of contacts 66₂ is ineffectual at this point because limit switches 88 and 90 are open to line 86. The opening of contacts 66₄ is ineffectual at this point because contacts 74₁ are open. The closure of contacts 66₃ energizes winding 60, opening contacts 60₂ and 60₃, de-energizing the timer clutch winding 46 and the alarm 52 and permitting the timer 26 to reset. Simultaneously, the closure of contacts 66₃ causes the machine to commence dispensing. Each time that a unit of predetermined amount of material has been dispensed, as when either of the dispensing pumps reaches the end of its dispensing stroke and actuates limit switch 88 or 90, winding 68 is energized, that winding causing stepper switch 28' to move one step. The switch 28', after it has counted out a predetermined number of steps, will close a circuit to windings 70 and 72. Winding 70 is effective to reset the stepper switch 28' and winding 72 is effective to step the stepper switch 30'. The switch 28' will again count out a predetermined number of units, after which it will step switch 30' again. Obviously, a single stepper switch could be employed, but by using two such switches connected as shown a greater flexibility in the selection of the number of steps is permitted.

After switch 30' has counted out, it will close a circuit to energize winding 74 closing contacts 74₁ and 74₂ and opening contacts 74₃. The closure of contacts 74₁ is ineffectual at this point because contacts 66₄ are open. The closure of contacts 74₂ energizes winding 78 and lights pilot light 20, the latter indicating that automatic dispensing has taken place. Contacts 78₁ close to form a holding circuit for winding 78 and pilot light 20. Contacts 78₂ close to form a circuit through resistor 92 whereby the pilot light 20 may be extinguished whenever use is made of footswitch 14 to initiate a normal dispensing cycle or a solvent purge cycle. The opening of contacts 74₃ de-energizes winding 66 opening contacts 66₁ to further break the holding circuit for winding 66. Contacts 66₂ open to prevent energization of stepper switch winding 68 by normal use of the machine. Contacts 66₃ open to cause the machine to cease automatically dispensing. The opening of contacts 66₃ also de-energizes winding 60 opening contacts 60₁ ineffectually and closing contacts 60₂ to again energize the timer 26 which again commences to time out. The closure of contacts 66₄ energizes winding 76 which serves to reset stepper switch 30' thereby de-energizing winding 74 opening contacts 74₁ to de-energize reset winding 76. The opening of contacts 74₂ and the closing of contacts 74₃ are ineffectual at this point.

The eventual timing out of the re-energized timer 26, followed by an automatic emergency dispensing cycle, will continue until such time as the operator takes appropriate steps. One of the steps which he can take is to cause a normal dispensing cycle to be initiated by stepping on the foot switch 14. This will not only close switch 80 and open contacts 60₂, de-energizing and resetting the timer 26, but will also close a circuit through contact 78₂ and resistor 92, shorting out the winding 78, extinguishing the pilot light 20, and permitting contacts 78₁ and 78₂ to open.

If the operator should wish to shut off the machine he will move switch 34 to open position. This will de-energize relay winding 64 but will not affect the energization of relay winding 62. Hence contacts 64₁ will close and contacts 62₃ will remain closed. The alarm 52 will therefore sound. Consequently the operator cannot accidentally turn off the machine while the mixer 12 contains time-sensitive material without being warned that he has done something wrong.

In order to purge the mixer 12 of the time-sensitive material the operator must leave switch 34 in its closed position and move switch 54 to connect with line 56. Then, when foot switch 14 is closed to initiate a normal dispensing cycle which will cause the purging solvent to clean out the machine, switch 80 will close, energizing relay winding 58 and opening contacts 58₁, thereby de-energizing winding 62. Contacts 62₁ open, breaking the holding circuit for winding 62, contacts 62₂ open, de-energizing the timer 26 and permitting it to reset, and contacts 62₃ open, thus preventing the subsequent actuation of the alarm 52 when the switch 34 is subsequently opened.

From the above it will be seen that upon the completion of a normal dispensing cycle the timer 26 will commence to time, and if another normal dispensing cycle is not initiated within a predetermined period of time an automatic emergency dispensing cycle will be initiated, the amount of material dispensed in the automatic emergency dispensing cycle being controlled, by setting of the selector switches 28 and 30, entirely independently of the amount of material dispensed in the normal cycle under control of the means 16. An alarm will be sounded shortly prior to the time that the automatic emergency dispensing cycle is to commence. Automatic timing and emergency dispensing will continue until such time as normal dispensing is resumed. The pilot light 20 will indicate that an automatic dispensing cycle has occurred, and will continue to give that indication until such time as the operator takes over control by actuating the normal dispensing cycle control means 16. If the operator should attempt to turn off the machine before it has been purged of time-sensitive material, the alarm 52 will sound.

The single embodiment of the present invention here specifically disclosed is adapted to be used in conjunction with dispensing machines of many different types and having such other control systems as may be desired and as will not be incompatible with the instant system. In addition, many variations may be made in the control arrangements here specifically disclosed, all without departing from the spirit of the invention as defined in the following claims.

I claim:

1. In combination, a dispensing machine active to dispense material in units of predetermined amount, first control means active, when actuated, to cause said machine to dispense a predetermined minimum amount of material, means for actuating said first control means, second control means active, when actuated, to cause said machine to dispense a predetermined number of said units, timing means, and interlock means effective to perform the following functions: (1) energize said timing means when the dispensing caused by said first control means is terminated; (2) actuate said second control means after said timing means has measured a predetermined time, provided that said first control means has not again been actuated prior to the expiration of said predetermined time; (3) re-set and energize said timing means when the dispensing caused by said second control means has terminated and said first control means has not been actuated; and (4) reset said timing means upon actuation of said first control means prior to the expiration of said predetermined time.

2. In combination, a dispensing machine active to dispense material in units of predetermined amount, first control means active, when actuated, to cause said machine to dispense a predetermined minimum amount of material, means for actuating said first control means, second control means active, when actuated, to cause said machine to dispense a predetermined number of said units, an alarm, timing means, and interlock means effective in combination with said timing means to perform the following functions: (1) energize said timing means when the dispsensing caused by said first control means is terminated; (2) actuate said second control means after said timing means has measured a predetermined time, provided that said first control means has not again been actuated prior to the expiration of said predetermined time; (3) re-set and energize said timing means when the dispensing caused by said second control means has terminated and said first control means has not been actuated; (4) reset said timing means upon actuation of said first control means prior to the expiration of said predetermined time; and (5) actuate said alarm a given time interval prior to the measurement of said predetermined time by said timing means.

3. In combination, a dispensing machine active to dispense material in units of predetermined amount, first control means active, when actuated, to cause said machine to dispense a predetermined minimum amount of material, means for actuating said first control means, second control means active, when actuated, to cause said machine to dispense a predetermined number of said units, an indicator, timing means, and interlock means effective to perform the following functions: (1) set and energize said timing means in response to dispensing caused by said first control means; (2) actuate said second control means after said timing means has measured a predetermined time, provided that said first control means has not again been actuated prior to the expiration of said predetermined time; (3) set and energize said timing means when the dispensing caused by said second control means has terminated and said first control means has not been actuated; and (4) energize said indicator when said second control means is actuated and retain said indicator in actuated condition until said first control means is thereafter actuated.

4. In combination, a dispensing machine active to dispense material in units of predetermined amount, first control means active, when actuated, to cause said machine to dispense a predetermined minimum amount of material, means for actuating said first control means, second control means active, when actuated, to cause said machine to dispense a predetermined number of said units, an alarm, an indicator, timing means, and interlock means effective in combination with said timing means to perform the following functions: (1) set and energize said timing means in response to dispensing caused by said first control means; (2) actuate said second control means after said timing means has measured a predetermined time, provided that said first control means has not again been actuated prior to the expiration of said predetermined time; (3) set and energize said timing means when the dispensing caused by said second control means has terminated; (4) actuate said alarm a given time interval prior to the measurement of said predetermined time; by said timing means; and (5) energize said indicator when said second control means is actuated and retain said indicator in actuated condition until said first control means is thereafter actuated.

5. In the combination of claim 1 means for supplying said machine with normal material, means for supplying said machine with purging material, means for selecting the type of material to be supplied to said machine, and additional interlock means active to de-energize said timing means when said machine is supplied with purging material and said first control means is actuated.

6. In the combination of claim 2, means for supplying said machine with normal material, means for supplying said machine with purging material, means for selecting the type of material to be supplied to said machine, and additional interlock means active to de-energize said timing means when said machine is supplied with purging material and said first control means is actuated.

7. In the combination of claim 6, first means for connecting said second control means to a source of power, second means independent of said first means for connecting said alarm to a source of power, and further interlock means active to actuate said alarm if said first connecting means is open-circuited before said machine has been supplied with purging material and said first control means has been actuated.

8. In the combination of claim 4, means for supplying said machine with normal material, means for supplying said machine with purging material, means for selecting the type of material to be supplied to said machine, first means for connecting said second control means to a source of power, second means independent of said first means for connecting said alarm to a source of power, and further interlock means active to actuate said alarm if said first connecting means is open-circuited before said machine has been supplied with purging material and said first control means has been actuated.

9. In combination, a dispensing machine, means for supplying said machine respectively with normal material or purging material, primary control means for controlling dispensing from said machine, safety control means active to cause dispensing from said machine if said primary control means is not actuated within a predetermined period of time, alarm means, electrical circuit means for connecting said safety control means to a source of power, and interlock means active to actuate said alarm when said connecting means is open-circuited before said machine is supplied with purging material and said primary control means is actuated.

10. In combination, a dispensing machine, means for supplying said machine respectively with normal material or purging material, primary control means for controlling dispensing from said machine, safety control means active to cause dispensing from said machine if said primary control means is not actuated within a predetermined period of time, an indicator actuated by said safety control means when the latter is active and normally then remaining actuated, alarm means, first interlock means active to de-actuate said actuated indicator when said primary control means is actuated, means for connecting said safety control means to a source of power, and second interlock means active to actuate said alarm when said connecting means is open-circuited before said machine is supplied with purging material and said primary control means is actuated.

References Cited in the file of this patent

UNITED STATES PATENTS

| | | |
|---|---|---|
| 2,788,953 | Schneider | Apr. 16, 1957 |
| 2,847,196 | Franklin et al. | Aug. 12, 1958 |
| 2,946,488 | Kraft | July 26, 1960 |